United States Patent
Pelaez et al.

(10) Patent No.: US 7,804,951 B2
(45) Date of Patent: Sep. 28, 2010

(54) SYSTEM AND METHOD FOR PLAYING TONES AND ANNOUNCEMENTS IN MULTIMEDIA COMMUNICATIONS NETWORKS

(75) Inventors: Mariana Benitez Pelaez, Naperville, IL (US); Dipak V. Patel, Hoffman Estates, IL (US); Peter Pradeep, Lisle, IL (US); Rajesh Rasalkar, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1933 days.

(21) Appl. No.: 10/758,362

(22) Filed: Jan. 15, 2004

(65) Prior Publication Data
US 2005/0157855 A1    Jul. 21, 2005

(51) Int. Cl.
*H04M 3/42* (2006.01)
(52) U.S. Cl. ............... 379/211.03; 379/72; 379/212.01
(58) Field of Classification Search ............ 379/67.1, 379/72, 76, 77, 88.25, 88.27, 221.02, 212.01, 379/211.02, 211.03; 370/352
See application file for complete search history.

(56) References Cited

U.S. PATENT DOCUMENTS

| | | | |
|---|---|---|---|
| 5,541,981 A * | 7/1996 | Lynn | 379/88.25 |
| 6,519,326 B1 * | 2/2003 | Milewski et al. | 379/67.1 |
| 2006/0029048 A1 * | 2/2006 | Deshpande et al. | 370/352 |
| 2006/0227957 A1 * | 10/2006 | Dolan et al. | 379/212.01 |

* cited by examiner

*Primary Examiner*—Md S Elahee
(74) *Attorney, Agent, or Firm*—Fay Sharpe LLP

(57) ABSTRACT

A method of assigning responsibility for playing tones and announcements to a network element in a multimedia communications network is provided. The method includes receiving a call from a caller to a subscriber at a first network element, as part of the call a tone or an announcement needs to be played to the subscriber; determining whether a second network element is able to play the tone or announcement; playing the tone or announcement through the second network element, if the second network element is able to play the tone or announcement; attempting to locate a third network element that is able to play the tone or announcement, if the second network element is not able to meet the request; and playing the tone or announcement through the third network element, if the third network element is located.

18 Claims, 4 Drawing Sheets

SYSTEM AND METHOD FOR PLAYING TONES AND ANNOUNCEMENTS IN MULTIMEDIA COMMUNICATIONS NETWORKS

BACKGROUND

The present invention relates generally to the art of telecommunications, and, more particularly, to a method and system for determining which element in a multimedia communications network will play a particular tone or announcement during a communications session.

Wireless communications networks allow mobile devices to communicate with each other and other networks, such as the Internet and the public switched telephone network. First and second generation wireless telephone systems are generally constrained in the amount of bandwidth available for communication. This limits capacity and also the types of services that can be provided. Third generation (3G) wireless systems, which are being developed through the 3rd Generation Partnership Project (3GPP), hold the promise of greater bandwidth, thereby increasing capacity and allowing for enhanced services, such as multimedia services. 3GPP is the new worldwide standard for the creation, delivery, and playback of multimedia over new, high-speed wireless networks. 3GPP enables the free sharing of multimedia files between a variety of devices, including cell phones, personal digital assistants (PDAs), and notebook and desktop computers. 3GPP devices include, in addition to a voice communication interface, capability for communication of data and display of data, including video.

3G networks include several network components that are adapted to play tones and announcements, such as call failure, call setup, special services tones and announcements. In 3G systems, both the media gateways (MGW) and the media resource function processors (MRFP) have the capability of playing tones and announcements. However, the 3G standards as defined in UMTS (universal mobile telecommunications system) Release 5, the MRFP plays tones and announcements, on instructions from the CSCF via the multimedia resource function controller (MRFC). In addition, there are fixed rules to route announcements and tones. However, there may be situations when the MRFP cannot apply the treatment (e.g., tones and announcements) to a call, as required.

Thus, there is a need for a system and method that provides both the MGW and the MRFP with the flexibility to play both announcements and tones. Furthermore, instead of following fixed rules on which component provides what tone or announcement in every call scenario, it would be desirable to allow the CSCF (call session control function) to determine where to play tones and announcements.

SUMMARY OF THE INVENTION

In accordance with one aspect of the present invention, a method of assigning responsibility for playing tones and announcements to a network element in a multimedia communications network is provided. The method includes receiving a call from a caller to a subscriber at a first network element, as part of the call a tone or an announcement needs to be played to the subscriber; determining whether a second network element is able to play the tone or announcement; playing the tone or announcement through the second network element, if the second network element is able to play the tone or announcement; attempting to locate a third network element that is able to play the tone or announcement, if the second network element is not able to meet the request; and playing the tone or announcement through the third network element, if the third network element is located.

In accordance with another aspect of the present invention, a system for assigning responsibility for playing tones and announcements to a network element in a multimedia telecommunications network is provided. The system includes a first network element for receiving a call from a caller to a subscriber, as part of the call a tone or an announcement needs to be played to the subscriber; determining means for determining whether a second network element is able to play the tone or announcement; means for playing the tone or announcement through the second network element, if the second network element is able to play the tone or announcement; attempting means for attempting to locate a third network element that is able to play the tone or announcement, if the second network element is not able to play the tone or announcement; and means for playing the tone or announcement through the third network element, if the third network element is located.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

It is to be understood that the specific methods and systems illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

For simplicity and ease of reference, the acronyms listed below shall be used in the specification to refer to structural and/or functional network elements, relevant telecommunications standards, protocols and/or services, terminology, etc., as they are commonly known in the telecommunications art, except to the extent they have been modified in accordance with aspects of the present invention.

Figure 1:
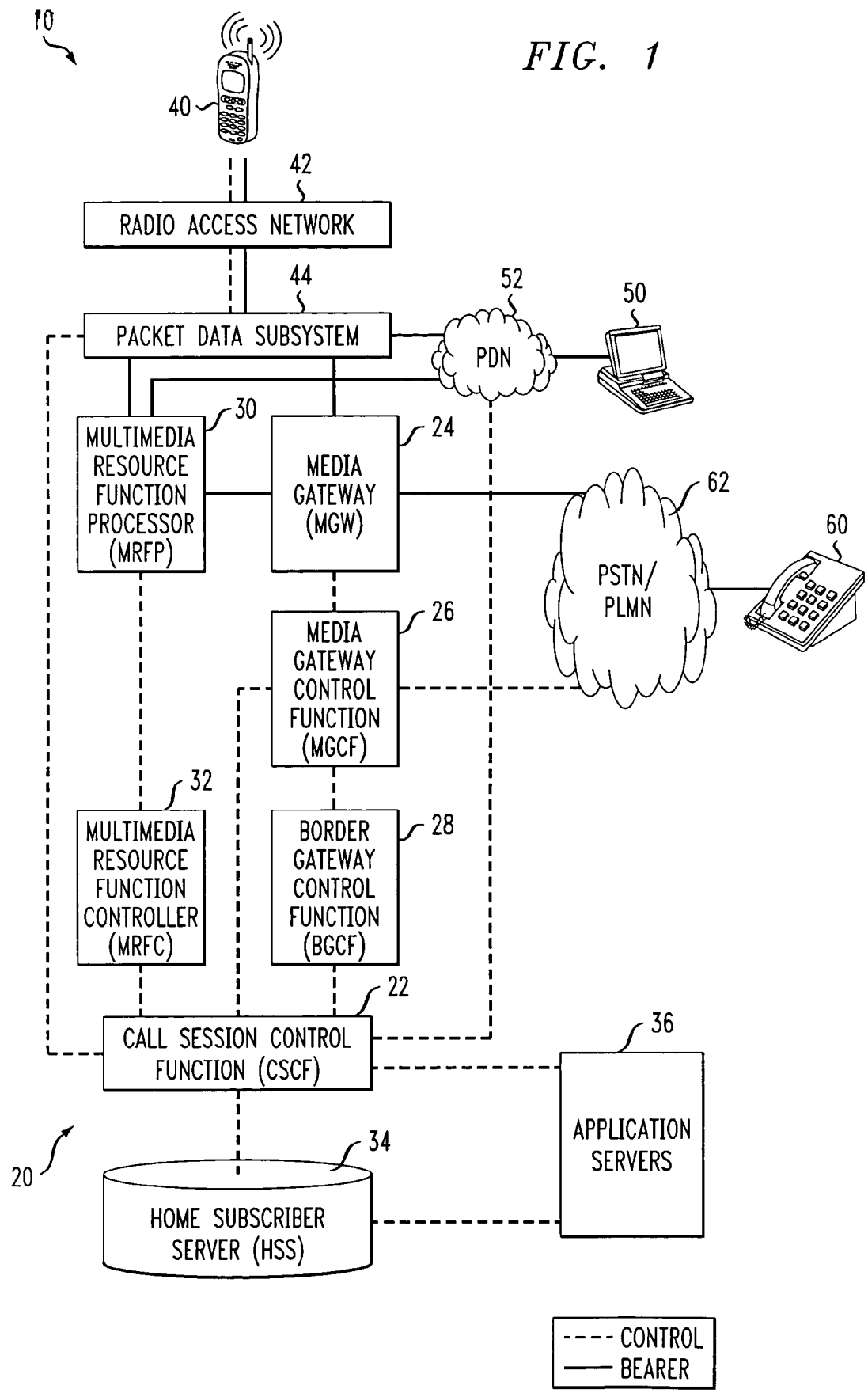
FIG. 1 is a block diagram showing a known multimedia communication environment suitable for practicing aspects of the present invention.

3G—$3^{rd}$ Generation
3GPP—$3^{rd}$ Generation Partnership Project
3GPP2—$3^{rd}$ Generation Partnership Project 2
AH —Address Handling
AS —Application Server
ATM—Asynchronous Transfer Mode
BGCF—Border Gateway Control Function
CCF—Call Control Function
CDMA—Code Division Multiple Access
CSCF—Call Session Control Function
DSP—Digital Signal Processing HLR—Home Location Register
HSS—Home Subscriber Server
ICGW—Incoming Call Gateway
IMS—IP Multimedia Subsystem
IP—Internet Protocol
MGCF—Media Gateway Control Function
MGW—Media Gateway
MRFC—Multimedia Resource Function Controller
MRFP—Multimedia Resource Function Processor
PDN—Public Data Network
PDS—Packet Data Subsystem
PLMN—Public Land Mobile Network
PSDN—Packet Switched Data Network
PSTN—Public Switched Telephone Network
RAN—Radio Access Network
SIP—Session Initiation Protocol
SPD—Serving Profile Database
TAG—Trunk Access Gateway
TDM—Time Division Multiplex
UMTS—Universal Mobile Telecommunications System
WAG—Wireless Access Gateway
WLAN—Wireless Local Access Network FIG. 1 is a block diagram of a known multimedia communications network 10, suitable for implementing aspects of the present invention. The multimedia communications network 10 provides users with a variety of options for communication. Users are able to transmit and receive multimedia communications, including audio, voice, video, and all types of data. The multimedia communications network 10 generally provides access to data networks, such as the Internet, and public telephone networks, including wireless networks. It is to be understood, however, that other such networks may be suitable for implementing aspects of the present invention.

The multimedia communications network 10 preferably includes an IP multimedia subsystem (IMS) 20. The IMS 20 relates to a technology standardized by the $3^{rd}$ Generation Partnership Project, also known as 3GPP, and this system is also defined by 3GPP2 (3rd Generation Partnership Project 2). The IMS 20 is used to join mobile communication with IP technologies by adding the ability to deliver integrated voice and data services over the IP-based packet switched data network (PSDN). IMS services are based on the Session Initiation Protocol (SIP), which is the signaling protocol standard for next-generation 3GPP mobile wireless networks. The IMS 20 includes a number of system elements, such as a call session control function (CSCF) 22, media gateways (MGW) 24, a media gateway control function (MGCF) 26, a border gateway control function (BGCF) 28, a multimedia resource function processor (MRFP) 30, a multimedia resource function controller (MRFC) 32, a home subscriber system (HSS) 34 and any number of application servers 36. As is known in the art, the IMS 20 manages call sessions and provides and administers packet switching for multimedia communications within the network 10.

A first communication device 40 is shown in FIG. 1. The first communication device 40 may be a wireless device that includes a user interface and an interface for coupling to a radio access network (RAN) 42. The user interface of the communication device 40 is typically referred to as terminal equipment and generally includes an audio interface, such as a microphone and speakers, a visual interface, such as a display, and a user input interface, such as a keyboard or touch pad. The interface for coupling to the RAN 42 is typically referred to as a mobile terminal and generally includes an over-the-air interface for transmitting and receiving data. The over-the-air interface of the communication device 40 is used to communicate with base stations in the RAN 42. Preferably, the communication device 40 and the base stations in the RAN 42 communicate over-the-air using a packet-based protocol. A packet data subsystem (PDS) 44 couples the RAN 42 with the IMS 20 and the public data network (PDN) 52 in the usual manner.

A second communication device 50 is shown as a laptop or notebook computer operatively connected to the IMS 20 via the PDN 52. The communication device 50 optionally employs a wireless local area network (WLAN) or wireline network, in the usual manner, to operatively connect to the PDN 52. A third communication device 60 is shown as an ordinary telephone equipped to handle only voice communications. The communication device 60 is operatively connected to the IMS 20 via the public switched telephone network/public land mobile network (PSTN/PLMN) 62.

Only three communication devices (40, 50, and 60) are shown in FIG. 1 for the purpose of simplifying the diagram. However, it is to be appreciated that any number of such terminals are typically situated in the multimedia communications network 10. Additionally, while each is depicted as a specific type of communication device, other like terminals may also be incorporated.

With continuing reference to FIG. 1, the bearer paths that carry (or relay) the communication traffic and/or user information for transmission from one terminal to another, which are known in the art, are shown as solid lines. Control paths carry associated signaling and/or control commands (or messages) to and between appropriate network elements for the purpose of managing and routing call sessions. The control paths are shown as dashed lines in FIG. 1. Suitably, SIP and other known protocols are used on the control and bearer paths, respectively. For example, the known H.248 protocol is suitably employed for media gateway controls. The CSCF 22, the BGCF 28, the MGCF 26, the MRFC 32 and the AS 36 comprise the call control and signaling functionality for the IMS 20, while the bearer paths interface with the MRFP 30 and the MGW 24 to provide and support interconnectivity to external networks and/or subsystems, such as the PDS 44, the PDN 52 and the PSTN/PLMN 62.

The CSCF 22 supports and controls multimedia sessions. The CSCF 22 invites elements such as the MGCF 26 and the MRFC 32 to call sessions to control the establishment and maintenance of bearer paths for call sessions by adding, modifying or deleting appropriate bearer paths for respective call sessions. The CSCF 22 is the signaling entity for call session control. It manages sessions by using SIP and/or other appropriate call/session establishment protocols, and it provides features and services and coordinates with other network elements for session control, service control and resource allocation.

The CSCF 22 may provide the following functionalities: incoming call gateway (ICGW), call control function (CCF), serving profile database (SPD), and address handling (AH). By functioning as an ICGW, the CSCF 22 acts as a call session entry point and routes incoming calls. The CCF generally refers to call setup/termination and state/event management. The CSCF 22 interacts with the MGCF 26 for calls to/from the PSTN/PLMN 62 and with the BGCF 28 for calls to the PSTN/PLMN 62 to determine the appropriate MGCF 26 to use. It also controls the MRFP 30 via the MRFC 32, which interprets information or signals coming from the CSCF 22 and controls the MFRP 30, in order to support conferencing and other multi-party services. SIP level registrations from subscribers are processed with the call control function. The call control function may also provide service trigger mechanisms to the AS 36 to invoke services provided thereby, either locally, at the AS 36, or elsewhere. It also reports call events for billing, auditing, intercept or other purposes, and may query the address handling function to check whether a requested communication is allowed given the current subscription. The serving profiling database function refers to the interaction of the CSCF 22 with the HSS 34 to receive and cache user profile information. The address handling function refers to address analysis, translation, modification (when appropriate) and mapping.

The MGW 24 acts as a bearer path interface between the IMS 20 and externals networks and/or subsystems, and provides translation resources and resources for modifying the bearer stream (e.g., encoding, transcoding, compression, packetization, depacketization, etc.). The bearer path elements include the MGCF 26, the MRFC 32, and the BGCF 28. These elements provide the flexibility to add, modify or delete bearers used by the users' services. More particularly, the MGW 24 interacts with the MGCF 26, which interprets signaling coming from the CSCF 22 and controls the MGW 24 to achieve resource allocation, bearer path control, and payload processing. There may be two types of media gateways used: (1) trunk access gateways (TAG), which have only TDM (time division multiplex) and IP resources, and (2) wireless access gateways (WAG), which have only ATM (Asynchronous Transfer Mode) resources. Either type is capable of playing tones and announcements.

The MGCF 26 communicates with the CSCF 22 in order to control the call state for media channels on one or more MGWs and performs conversions between Legacy and $3^{rd}$ Generation (3G) Universal Mobile Telecommunications System (UMTS)/Code Division Multiple Access (CDMA) network call control protocols. Similarly, the MRFC 32 controls the media stream resources in the MRFP 30, which also acts as a bearer path interface between the IMS 20 and external networks and/or subsystems, while being able to provide for conferencing or multiple party communications or other more advanced media services (relative to the MGW 24), including tones and announcements. The BGCF 28 selects the proper MGCF 26.

The MGW 24 and the MRFP 30 include various types of resources, such as: (1) DSP (digital signal processing) resources, which provide conversion from one payload type to another and are responsible for providing tones and announcements, echo cancellation, and silence suppression; (2) IP resources, which are essentially IP terminations within the MGW 24 and MRFP 30 function and are referred to generally as ephemeral terminations; (3) ATM resources, which are essentially ATM terminations within the MGW 24 function and are referred to generally as ephemeral terminations; and (4) TDM resources, which are essentially TDM terminations within the MGW 24 function and are referred to generally as physical terminations.

The HSS 34 is coupled to the CSCF 22 via a data link. The HSS 34 includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The AS 36 are preferably coupled to the IMS 20 for use in interaction with the communication devices 40, 50, 60. In particular, the CSCF 22 is coupled to the AS 36 via a data link. Also, the HSS 34 is preferably coupled to the AS 36. A myriad of services and applications may reside in or be coupled to the AS 36.

In the preferred embodiment, the CSCF 22, the MGCF 26, the MGW 24, the HSS 34, and the AS 36 are processor-based apparatus with data link interfaces for coupling together as described above and shown in FIG. 1. These apparatus include one or more processors that execute programs to implement the functionality described herein and generally associated with 3GPP/3GPP2 wireless systems. The flexibility of these processor-based systems permits ready integration into these systems of a network element selection method and system in accordance with the present invention.

As noted above, both the MGW 24 and the MRFP 30 have the flexibility to play announcements and tones. Preferably, the CSCF 22 will determine which element in the network 10 will play a requested tone or announcement during a call session according to an algorithm, which will be explained in greater detail later. Such a determination made by the CSCF 22 will preferably take into account any or all of the following factors:

a) the available IP/TDM/ATM resources at each of the MGWs 24 and MRFPs 30;

b) the current congestion (or load) level of each of the MGWs 24 and the MRFPs 30;

c) the pool of DSP resources available at each of the MGWs 24 and MRFPs 30; and d) the proximity of each of the MRFPs 30 to the subscriber's location within the network 10.

Of course, it is to be understood that this is not an exhaustive list and that the CSCF 22 may consider other factors as well.

Figure 2:
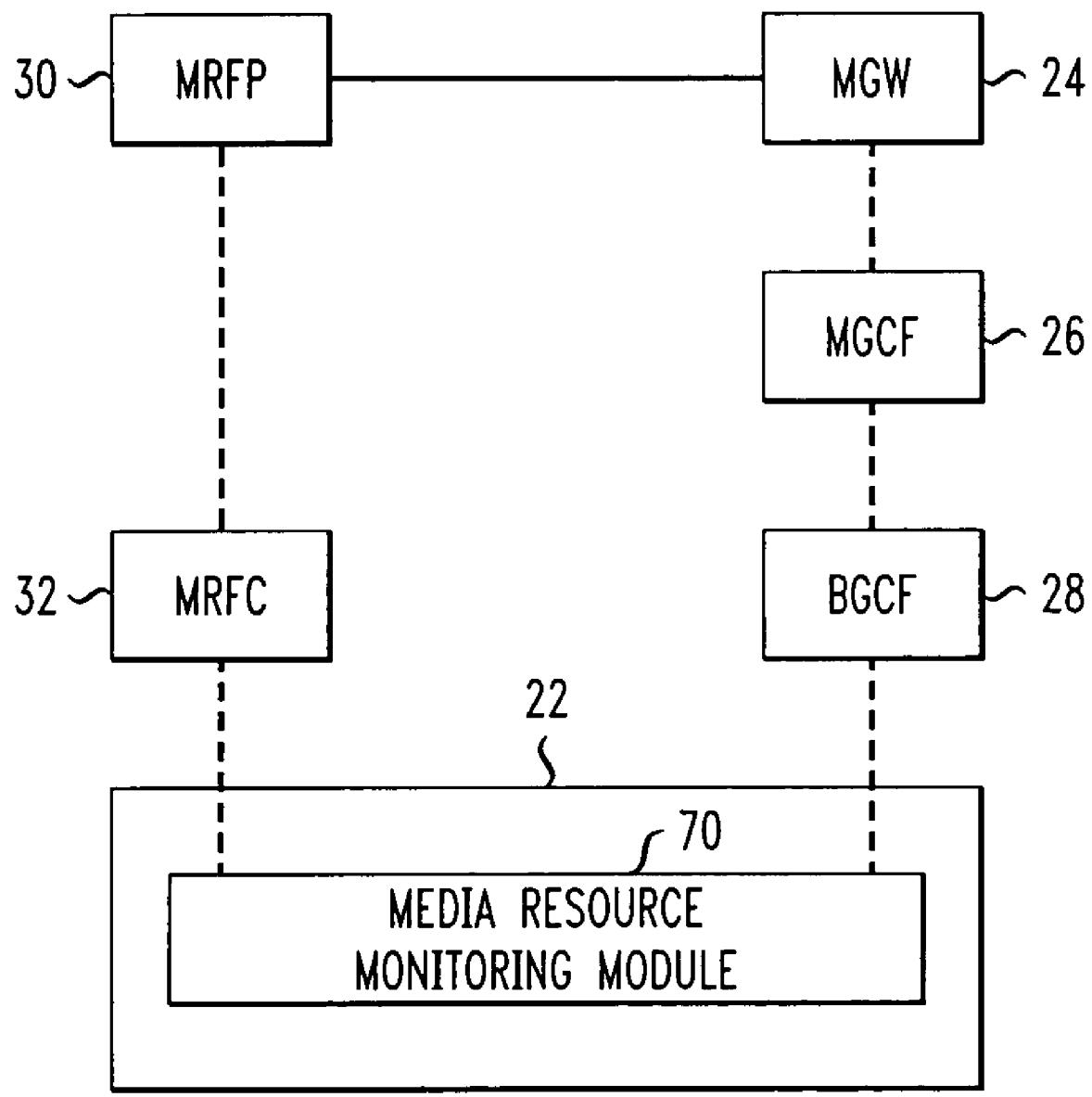
FIG. 2 is a block diagram showing a Call Session Control Function in accordance with an aspect of the present invention.

Further, as illustrated in FIG. 2, the CSCF 22 would preferably include at least one media resource monitoring module 70, which would constantly receive and store in a database (not shown) media resource data (i.e., load levels) from the MGWs 24 and the MRFPs 30 within the network 10.

Figure 3:
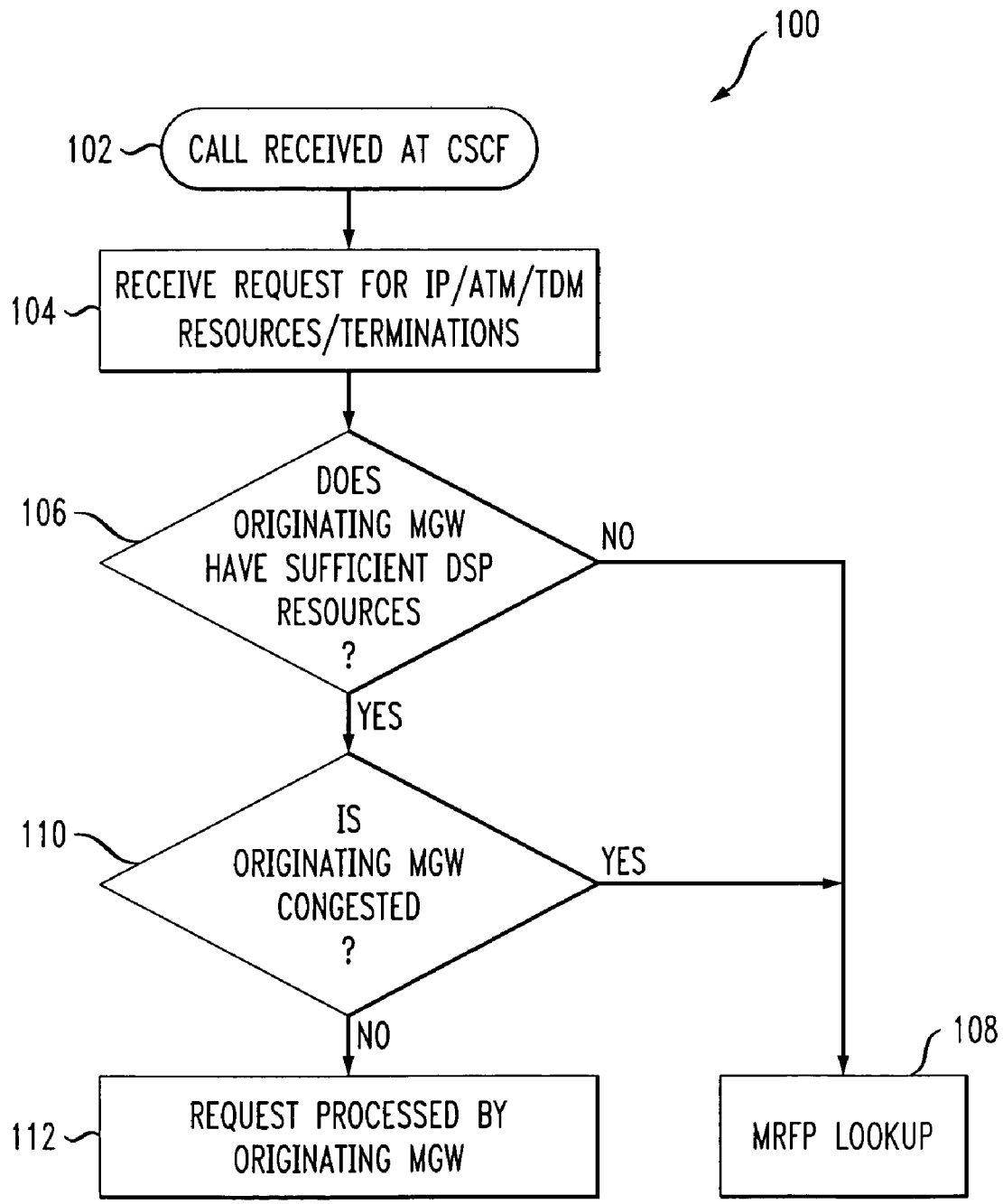
FIG. 3 is a flow chart illustrating a tone and announcement network component selection process in accordance with an aspect of the present invention.
Figure 4:
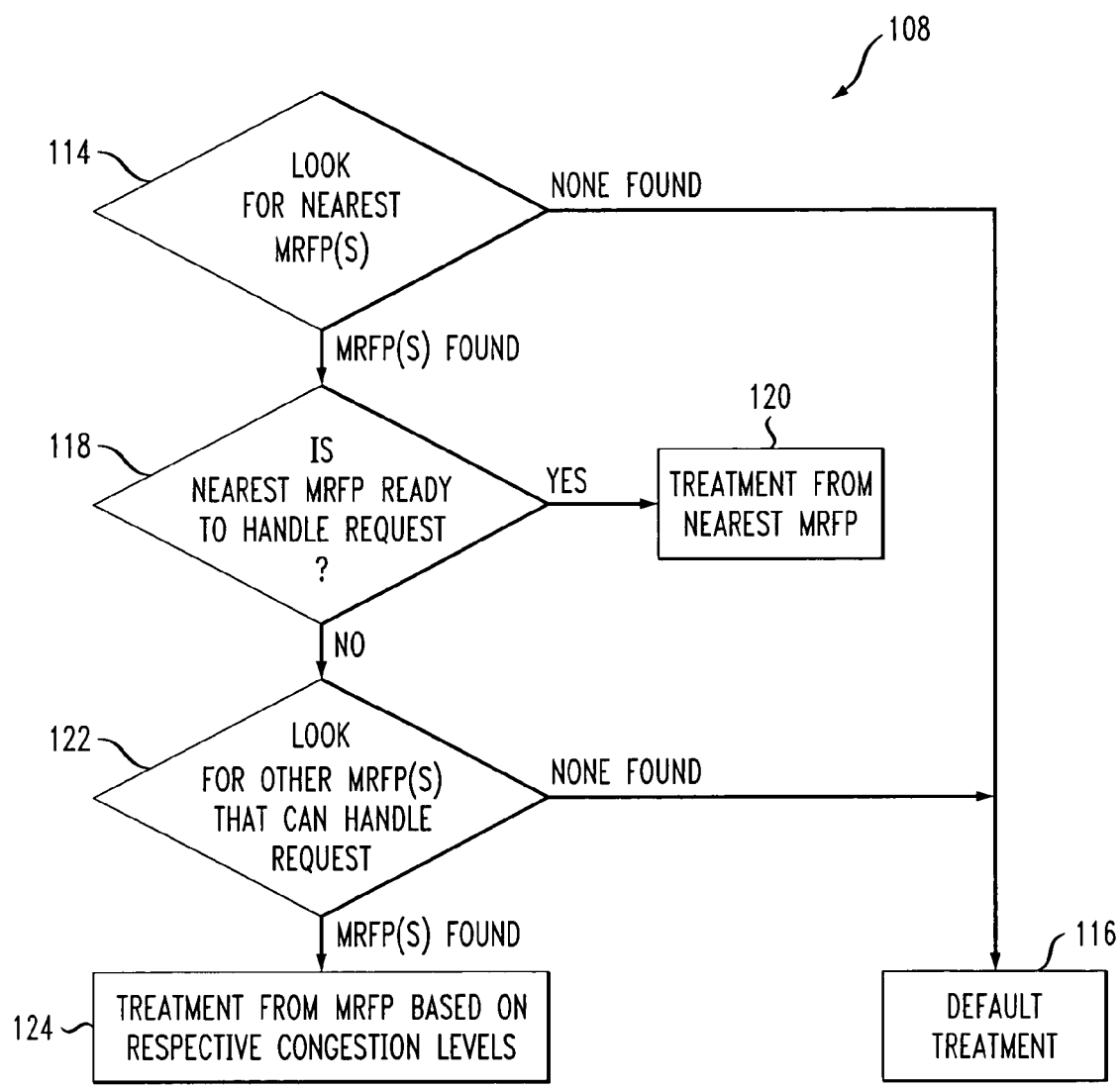
FIG. 4 is a flow chart illustrating an MRFP lookup process in accordance with an aspect of the present invention.

FIGS. 3 and 4 are flow charts illustrating a preferred method 100 of determining which element in the network 10 (MGW or MRFP) will play a tone or announcement during a communication session. Preferably, the method 100 is implemented through software in the CSCF 22. However, it is to be understood that the method 100 may be implemented through software distributed throughout the network 10.

Initially, in step 102, a call for a subscriber using communication device 40 is received at the CSCF 22 from a caller using the communication device 60. Next, a request for IP/ATM/TDM resources (or terminations) is recognized by the CSCF 22 (step 104). The nature of the resources/terminations requested is related to the type of call involved—i.e., whether it is an IP, an ATM or a TDM-based call. This call may include a tone or announcement that is to be played to the subscriber. A determination is then made by the CSCF 22, and preferably by the media resource monitoring module 70, as to whether the MGW 24 that is nearest the caller (also known as the originating MGW 24) has sufficient DSP resources for the request (step 106), i.e., whether the originating MGW 24 can play the requested tone or announcement. It is to be understood, however, that other MGWs 24 in the network 10 may be considered by the CSCF 22, if necessary. If not, then an MRFP lookup is implemented, as illustrated in FIG. 4 (step 108) and which will be explained later. However, if there are sufficient DSP resources, a further determination is made as to whether the originating MGW 24 is busy or congested, based upon provisioned values (step 110). If so, an MRFP lookup is implemented (step 108). Otherwise, the call may require the tone or announcement to be played through the originating MGW 24 (step 112).

With reference to FIG. 4, the MRFP lookup 108 is described below. Initially, all of the nearest MRFPs 30 for the originating MGW 24 are sought (step 114). If no suitable MRFPs 30 are found, then the default treatment for the request is made according to the provisions (step 116). This default treatment will be based on a fixed set of operator-defined (provisioned) treatments. Typically, the default treatment of tones and announcements in this situation is to release the call with the proper cause value, as known to those skilled in the art. However, additional treatments may be provisioned by the operator depending upon the system involved.

If at least one suitable MRFP 30 is found, however, then a further determination is made by the CSCF 22 as to whether the nearest MRFP 30 is ready to handle the request (step 118). If so, the treatment of the tone/announcement request is made through the nearest MRFP 30 (step 120). Otherwise, the nearest MRFPs 30 that may be able to handle the request are sought (step 122). If none are found, then the default treatment is to release the call with the proper cause value (step 116). However, if suitable MRFPs 30 are found, then the treatment is made from the appropriate MRFP 30 based upon their respective congestion levels (step 124).

To summarize, if the originating MGW is running out of resources (or is congested) when required to play a tone or announcement, the CSCF is able to provide another source for the tone or announcement. This process is implemented through software on the CSCF that makes a decision based upon the constant monitoring of the various resources in the MGWs and the MRFPs of the network. This process greatly increases the probability of being able to play tones and announcements for subscribers under any circumstances, thus providing more stable communication services for all subscribers. Further, it enables more efficient utilization of DSP resources within the network, thereby reducing the cost of additional DSP resources required during peak hours, while distributing the tone/announcement load among the different components in the network.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. In a multimedia communications network having a plurality of network elements, a method of assigning responsibility for playing tones and announcements to a network element, the method comprising:
   receiving a call from a caller to a subscriber at a first network element, as part of signaling signals of the call a tone or an announcement needs to be played to the subscriber;
   determining whether a second network element is able to play the tone or the announcement;
   playing the tone or the announcement through the second network element, if the second network element is able to play the tone or announcement;
   attempting to locate a third network element that is able to play the tone or the announcement, if the second network element is not able to play the tone or the announcement; and
   playing the tone or the announcement through the third network element, if the third network element is located.

2. The method defined in claim 1, wherein the first network element comprises a call session control function.

3. The method defined in claim 1, wherein the second network element comprises an originating media gateway.

4. The method defined in claim 1, wherein the third network element comprises a multimedia resource function processor.

5. The method defined in claim 2, wherein the second network element comprises an originating media gateway.

6. The method defined in claim 5, wherein the third network element comprises a multimedia resource function processor.

7. The method defined in claim 1, further comprising:
   receiving data associated with the second network element and the third network element; and
   using the data in determining where to play the tone or the announcement.

8. The method defined in claim 7, wherein the data includes at least one of the load levels of the second and third network elements, the digital signal processing resources available at the second and third network elements, the internet protocol resources available at the second and third network elements, the time division multiplex resources available at the second and third network elements, the asynchronous transfer mode resources available at the second and third network elements, and the proximity of the third network element to the subscriber's location in the network.

9. The method defined in claim 8, wherein the first network element comprises a call session control function, the second network element comprises an originating media gateway, and the third network element comprises a multimedia resource function processor.

10. In a multimedia telecommunications network having a plurality of network elements, a system for assigning responsibility for playing tones and announcements to a network element, the system comprising:
    a first network element for receiving a call from a caller to a subscriber, as part of signaling signals of the call a tone or an announcement needs to be played to the subscriber;
    determining means for determining whether a second network element is able to play the tone or the announcement;
    means for playing the tone or the announcement through the second network element, if the second network element is able to play the tone or the announcement;
    attempting means for attempting to locate a third network element that is able to play the tone or the announcement, if the second network element is not able to play the tone or the announcement; and
    means for playing the tone or the announcement through the third network element, if the third network element is located.

11. The system defined in claim 10, wherein the first network element comprises a call session control function.

12. The system defined in claim 10, wherein the second network element comprises an originating media gateway.

13. The system defined in claim 10, wherein the third network element comprises a multimedia resource function processor.

14. The system defined in claim 11, wherein the second network element comprises an originating media gateway.

15. The system defined in claim 14, wherein the third network element comprises a multimedia resource function processor.

16. The system defined in claim 10, further comprising:
    receiving means for receiving data associated with the second network element and the third network element; and
    using the data in determining where to play the tone or the announcement.

17. The system defined in claim 16, wherein the data includes at least one of the load levels of the second and third network elements, the digital signal processing resources available at the second and third network elements, the internet protocol resources available at the second and third network elements, the time division multiplex resources available at the second and third network elements, the asynchronous transfer mode resources available at the second and third network elements, and the proximity of the third network element to the subscriber's location in the network.

18. The system defined in claim 17, wherein the first network element comprises a call session control function, the second network element comprises an originating media gateway, and the third network element comprises a multimedia resource function processor.

* * * * *